US009753766B2

(12) United States Patent
Marr et al.

(10) Patent No.: US 9,753,766 B2
(45) Date of Patent: Sep. 5, 2017

(54) APPARATUS AND METHOD FOR ALLOCATING RESOURCES USING PRIORITIZATION OF REQUESTS AND UPDATING OF REQUESTS

(71) Applicant: Raytheon Company, Waltham, MA (US)

(72) Inventors: Harry B. Marr, Manhattan Beach, CA (US); Craig A. Snow, Manhattan Beach, CA (US); Leo Linsky, Carlsbad, CA (US); Kellie Canida, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 40 days.

(21) Appl. No.: 14/553,139

(22) Filed: Nov. 25, 2014

(65) Prior Publication Data
US 2016/0147564 A1 May 26, 2016

(51) Int. Cl.
*G06F 9/46* (2006.01)
*G06F 9/48* (2006.01)
*G06F 9/50* (2006.01)

(52) U.S. Cl.
CPC .......... *G06F 9/4818* (2013.01); *G06F 9/5022* (2013.01); *G06F 9/5027* (2013.01); *G06F 2209/5021* (2013.01)

(58) Field of Classification Search
CPC . G06F 13/26; G06F 2209/5021; G06F 9/5038
(Continued)

(56) References Cited

U.S. PATENT DOCUMENTS 6,381,261 B1 4/2002 Nagazumi
6,665,701 B1 12/2003 Combs et al.
(Continued)

FOREIGN PATENT DOCUMENTS

EP 1583297 10/2005
WO 0175622 10/2001
(Continued)

OTHER PUBLICATIONS

Singh et al.; "Reliable End-to-End APNs Interaction Framework"; International Conference on Computing for Sustainable Global Development; Mar. 2014.
(Continued)

*Primary Examiner* — Benjamin Wu
*Assistant Examiner* — Willy W Huaracha
(74) *Attorney, Agent, or Firm* — Burns & Levinson LLP; Joseph M. Maraia

(57) ABSTRACT

A system and method for allocating resources receive one or more resource requests describing tasks, each of the one or more resource requests having a request priority, a requested configuration type, and a requestor identifier. In a winner-take-all circuit, all of the existing resource priorities within each configuration of the requested configuration type are compared to determine a highest-priority task occupying each assignment. In a loser-take-all circuit, one or more current highest resource priorities of each configuration within the requested configuration type, which are output from the winner-take-all circuit associated with the requested resource assignment, each of the one or more current resources having a current priority, are compared. One of the one or more current resource configurations within the requested configuration type having the lowest current priority is identified as the lowest-priority current resource configuration. The requested configuration type is
(Continued)

allocated to the selected resource request if the request priority is higher than the lowest current priority configuration output from the loser-take-all circuit. The method further comprises continuing to allocate the requested configuration type to the lowest-priority current resource tasks currently occupying the lowest current priority configuration within the requested configuration if the lowest current priority configuration within the requested configuration is higher than or equal to the request priority.

19 Claims, 9 Drawing Sheets

(58) Field of Classification Search
USPC ................................................ 718/102, 103
See application file for complete search history.

(56) References Cited

U.S. PATENT DOCUMENTS

| | | | | |
|---|---|---|---|---|
| 6,882,649 | B1* | 4/2005 | Gura | G06F 13/368 |
| | | | | 370/395.42 |
| 7,996,595 | B2* | 8/2011 | Wolfe | G06F 13/26 |
| | | | | 710/262 |
| 2001/0054107 | A1 | 12/2001 | Aufderheide | |
| 2003/0107410 | A1 | 6/2003 | Callahan, Jr. | |
| 2006/0056618 | A1 | 3/2006 | Aggarwal et al. | |
| 2010/0077399 | A1* | 3/2010 | Plondke | G06F 9/4818 |
| | | | | 718/103 |
| 2011/0067032 | A1* | 3/2011 | Daly | G06F 9/4881 |
| | | | | 718/103 |
| 2011/0231853 | A1* | 9/2011 | Murray | H04L 41/00 |
| | | | | 718/103 |
| 2012/0215598 | A1 | 8/2012 | Georgis et al. | |
| 2012/0250509 | A1* | 10/2012 | Leung | H04W 76/04 |
| | | | | 370/235 |
| 2013/0281145 | A1* | 10/2013 | Noble | H04W 16/28 |
| | | | | 455/512 |
| 2016/0150520 | A1* | 5/2016 | Fodor | H04W 28/0215 |
| | | | | 455/426.1 |

FOREIGN PATENT DOCUMENTS

| | | |
|---|---|---|
| WO | 2007048769 | 5/2007 |
| WO | 2012028764 | 3/2012 |

OTHER PUBLICATIONS

Bohm et al.; "Policy Based Architecture for the UMTS Multimedia Domain"; Network Computing and Applications; IEEE; Apr. 2003.
International Search Report and Written Opinion mailed Nov. 19, 2015 in corresponding International Application No. PCT/US2015/044443, filed Aug. 10, 2015.

* cited by examiner

| Destination: uut/Q_0_48 (FF) | clk: board_clk rising at 10.000ns | | |
|---|---|---|---|
| Requirement | Data Path Delay | Clock Path Skew: | Clock Uncertainty |
| 10.000ns | 9.906ns (Levels of Logic = 7) | 0.006ns (0.457 - 0.451) | 0.035ns |

| Clock Uncertainty: 0.035ns ((TSJ^2 + TIJ^2)^1/2 + DJ) / 2 + PE | |
|---|---|
| Total System Jitter (TSJ): | 0.070ns |
| Total Input Jitter (TIJ): | 0.000ns |
| Discrete Jitter (DJ): | 0.000ns |
| Phase Error (PE): | 0.000ns |

Maximum Data Path at Slow Process Corner: uut/Pc_0 to uut/Q_0_48

| Location | Delay type | Delay(ns) | Physical Resource Logical Resource(s) |
|---|---|---|---|
| SLICE_X14Y29.AQ | Tcko | 0.447 | uut/Pc<1> uut/Pc_0 |
| SLICE_X6Y28.A6 | net (fanout=31) | 0.915 | uut/Pc<0> |
| SLICE_X6YA8.A | Tilo | 0.203 | uut/Mmux_Q[6][10]_Q[6][10]_mux_1008_OUT127 uut/current[9]_Q[0][9]_Less Than_729_o1 |
| SLICE_X15Y32.C1 | net (fanout=14) | 1.377 | uut/current[9]_Q[0][9]_Less Than_729_o |
| SLICE_X15Y32.C | Tilo | 0.259 | uut/Mmux_Q[6][10]_Q[6][10]_mux_1008_OUT10033 uut/Mmux_Q[6][10]_Q[6][10]_mux_1008_OUT15121 |
| SLICE_X15Y29.B6 | net (fanout=5) | 1.587 | uut/Mmux_Q[6][10]_Q[6][10]_mux_1008_OUT1512 |
| SLICE_X15Y29.B | Tilo | 0.259 | N328 uut/Mmux_Q[6][10]_Q[6][10]_mux_1008_OUT1556_SW0 |
| SLICE_X7Y28.B6 | net (fanout=1) | 0.611 | N24 |
| SLICE_X7Y28.B | Tilo | 0.259 | N303 uut/Mmux_Q[6][10]_Q[6][10]_mux_1008_OUT1556 |
| SLICE_X12Y31.D1 | net (fanout=18) | 1.219 | uut/Mmux_Q[6][10]_Q[6][10]_mux_1008_OUT1556 |
| SLICE_X12Y31.CMUX | Topdc | 0.338 | uut/n0754[76:0]<43>613 uut/Mmux_Q[6][10]_Q[6][10]_mux_1008_OUT1552_SW11_F uut/Mmux_Q[6][10]_Q[6][10]_mux_1008_OUT1552_SW11 |
| SLICE_X12Y31.A2 | net (fanout=1) | 0.595 | N302 |
| SLICE_X12Y31.A | Tilo | 0.205 | uut/n0754[76:0]<43>613 uut/Mmux_Q[6][10]_Q[6][10]_mux_1008_OUT171_SW0_SW0 |
| SLICE_X7Y32.A3 | net (fanout=1) | 1.310 | N225 |
| SLICE_X7Y32.CLK | Tas | 0.322 | uut/Q_0<51> uut/Mmux_Q[6][10]_Q[6][10]_mux_1008_OUT171 uut/Q_0_48 (2.292ns logic, 7.614ns route (23.1% logic, 76.9% route) |
| | Total | 9.906ns | |

Slack (setup path):0.111ns (requirement − (data path − clock path skew + uncertainty))

Source: uut/Pc_2 (FF)   clk: board_clk rising at 0.000ns

*Fig. 6*

APPARATUS AND METHOD FOR ALLOCATING RESOURCES USING PRIORITIZATION OF REQUESTS AND UPDATING OF REQUESTS

BACKGROUND

1. Technical Field

This application relates to allocation of multiple resources based on received requests for the resources and, more particularly, to systems and methods for allocating multiple resources using prioritization of the requests for the resources to allocate the resources.

2. Discussion of Related Art

In many electronic systems, it is often desirable to manage the processing or servicing of multiple requests for a group of resources, particularly in situations in which there are often fewer resources available than there are requests for the resources. By way of specific example, in a radar system, it may be desirable to track, jam or otherwise counter multiple objects or targets simultaneously, and the radar system may not have sufficient resources to accommodate every available task.

SUMMARY

The present disclosure is directed to an approach to arbitrating, allocating and otherwise managing multiple requests for resources. The approach of the disclosure is applicable in multiple situations in which the number of requests may greatly outweigh the number of resources being requested, and there is a need to switch between the multiple requests and resources very quickly. According to exemplary embodiments, in the case of a pulsed radar system, allocation of resources, such as jamming or sensing resources, can be allocated on a sub-pulse level, such that multiple threats can be jammed, and the system can switch between threats very quickly. According to the disclosure, each request may be associated with a priority level, based on the need of the requesting entity to have its request serviced by allocation to the resources. In some exemplary embodiments, the highest-priority requests are instantly allocated to resources, regardless of the current state of the resources According to the disclosure, in the case of the radar system application, the resources being requested and allocated can include multiple sub-apertures (elements) of a phased-array architecture. Each request may include identification of a specific configuration type, which refers to all valid combinations of elements of the array required to service the request, that is, for example, to transmit the specified radar signal. According to the exemplary embodiments, an architecture is provided to allow multiple resource requests for generally differing configuration types, having different priorities, to be made and resolved at the sub-pulse timing level. According to some exemplary embodiments, resource requests with the highest priority are allocated first. Specifically, in the configuration in which the system of the disclosure is implemented in a field-programmable gate array (FPGA), new resource requests can be allocated to resources in two single clock cycles of the FPGA. According to some exemplary embodiments, an ordered priority queue is also provided. The priority queue allows lower-priority resource requests to be continually reviewed for allocation to resources, such that missing or forgetting of lower-priority requests is avoided.

Conventional resource management, for example, radar resource management, involves managing resources at very coarse-grained level, e.g., at the millisecond level. These conventional radar resource managers manage modes and dwell schedules, i.e., which modes will run and which dwells get scheduled, but they do not operate at the pulse level. Common scheduling algorithms currently include: artificial intelligent algorithms, Q-RAM algorithms, stochastic dynamic programming algorithms, waveform-aided algorithms, and adaptive update rate algorithms. Many priority queue structures that implement a first-in, first-out (FIFO) queue, but where higher-priority items are served first, exist. Also, hash functions which directly map a value to a memory address in a table also exist. Prior approaches also schedule resources a priori and do not mediate real-time contention for resources. Furthermore, many sorting algorithms exist to sort prioritized lists, but all of them take at best N log N time steps, assuming N elements, to sort, which is too slow for the applications to which the present disclosure is applicable, such as the radar application. Other attempts recently have been made to solve the problem of allocation of resources by using a simple look-up table (LUT), in which all possible requests are mapped to all possible states; however, these LUT approaches are too resource inefficient and are too large to apply as the present disclosure is applied, since, for example, the LUT can become too large to implement in a FPGA or similar circuit. Also, these conventional LUT approaches do not ensure continuous automatic reconsideration of rejected requests to prevent forgetting of lower-priority requests. It is also noted that many of the prior approaches are primarily software solutions, which are dramatically slower than hardware solutions, in which the source of time delay is typically just combinational logic propagation delay.

The present disclosure describes an architecture and approach which allow multiple resource requests to be made and resolved at the sub-pulse timing level, in a single clock cycle, by being able to compare a configuration list with another configuration list, where each item in the list is compared in parallel. Resource requests with the highest priority are allocated first, in a single clock cycle. A priority interrupt list allows lower-priority resource requests to be continually reviewed for allocation so as to avoid forgetting of lower-priority requests.

According to the exemplary embodiments, a resource request queue is ordered in one clock cycle by a parallel configuration list method. The amount of hardware required increases quadratically with the maximum number of requests to be held in the priority queue, and so this application is best suited for low, static numbers of requestors. In some exemplary embodiments, each priority level has its own queue of requests that have not yet been granted, and the queue with the highest priority can also have a counter for each resource size requested, e.g., the number of requests in the queue which have requested each possible configuration type of resources, e.g., elements in the phased array. That is, the counter can keep track of the configuration type of requests in a queue for resource size $1, 2, \ldots, j$, where $j$ is the largest resource size. According to some exemplary embodiments, a resource request can be either instantly granted in one cycle, or, if rejected, the request is added back into a priority queue and instantly granted as soon as the needed resource is freed, i.e., becomes available, without the same request having to be made again. According to the exemplary embodiments, the number of requests that are granted is maximized such that these constraints are satisfied, in constant time, in a single clock cycle. According to the exemplary embodiments, a coordinate-based architecture in which requests are associated with coordinates of possible requested resources, e.g., 1, 2, 3, 4 of a four-element phased array, such that each resource, not just the type of resource, is assigned a coordinate and a coordinate priority to create a resource configuration. According to the exemplary embodiments, a resource request configuration is compared with the current resource allocation state configuration to determine immediately a new resource allocation state configuration. The system of the disclosure will be in its optimal state, which accommodates high priority requests first, after cycling through the priority queues of denied requests.

According to one aspect, a method for allocating one or more resources is provided. The method includes receiving one or more resource requests describing tasks, each of the one or more resource requests having a request priority, a requested configuration type, and a requestor identifier. One of the one or more resource requests is selected. In a winner-take-all circuit, all of the existing resource priorities within each configuration of the requested configuration type are compared to determine a highest-priority task occupying each assignment. In a loser-take-all circuit, one or more current highest resource priorities of each configuration within the requested configuration type, which are output from the winner-take-all circuit associated with the requested resource assignment, each of the one or more current resources having a current priority, are compared. One of the one or more current resource configurations within the requested configuration type having the lowest current priority is identified as the lowest-priority current resource configuration. The requested configuration type is allocated to the selected resource request if the request priority is higher than the lowest current priority configuration output from the loser-take-all circuit. The method further comprises continuing to allocate the requested configuration type to the lowest-priority current resource tasks currently occupying the lowest current priority configuration within the requested configuration if the lowest current priority configuration within the requested configuration is higher than or equal to the request priority.

According to some exemplary embodiments, the method further comprises operating the one or more resources according to one or more resource operating parameters associated with the selected resource request if the requested configuration is allocated to the selected resource request, and operating the one or more resources according to one or more resource operating parameters associated with the currently allocated tasks if the requested resource assignment is still to be allocated to the lowest priority current resource state.

According to some exemplary embodiments, selecting one of the one or more resource requests further comprises selecting a first one of the one or more resource requests to be received.

According to some exemplary embodiments, the method further comprises adding the selected resource request to a denied request queue if the requested configuration type is not allocated to the request, and adding the task(s) occupying the lowest-priority current resource configuration within the requested configuration type to a denied request queue if the requested resource assignment is allocated to the selected resource request.

According to some exemplary embodiments, the comparing and allocating steps for each resource request are performed in a constant period of time, regardless of a quantity of resources that can be requested and requestors competing for the resources.

According to another aspect, a system for allocating one or more resources is provided. The system includes a FIFO buffer for selecting one of one or more received resource requests, each of the one or more received resource requests having a request priority and a requested configuration type. A winner-take-all circuit assigns a priority level to each configuration within the selected configuration type by determining the highest-priority task running on a resource within each configuration. A loser-take-all circuit selects the lowest-priority configuration within the requested configuration type, by using the priority levels determined by the winner-take-all circuit for each configuration. The loser-take-all circuit allocates the requested configuration type to the selected resource request if the request priority is higher than the lowest current priority. The loser-take-all circuit continues to allocate the requested configuration type to the lowest-priority current resource tasks currently occupying the lowest current priority configuration within the requested configuration if the lowest current priority configuration within the requested configuration is higher than or equal to the request priority.

According to some exemplary embodiments, the system further comprises an output port for providing control information about which tasks are currently allocated on the system's resources.

According to some exemplary embodiments, the FIFO buffer selects a first one of the one or more resource requests to be received.

According to some exemplary embodiments, the system further comprises a denied request queue, wherein the selected resource request is added to the denied request queue if the selected resource request is not allocated to the resource and the task(s) currently occupying the lowest current priority configuration within the requested configuration are added to the denied request queue if the requested resource assignment is allocated to the selected resource request.

According to some exemplary embodiments, the one or more resources include a plurality of resource elements.

According to some exemplary embodiments, the system further comprises a plurality of winner-take-all circuits and loser-take-all circuits. The system directs the selected resource request to one of the plurality of winner-take-all circuits associated with the specific resource configuration type requested by the requested resource assignment. Each of the plurality of winner-take-all circuits is configured to compare one or more current resource states associated with the specific resource configuration type requested by the resource request, each of the one or more current tasks currently allocated on the resources within each configuration within each configuration type having a current priority. The winner-take-all circuit identifies the highest-priority task running on each configuration within the requested configuration type. The loser-take-all circuit identifies one of the one or more configurations within the requested configuration type having the lowest current priority as the lowest-priority current configuration. The priorities used by the loser-take-all circuits are the priorities output by the winner-take-all circuits.

According to some exemplary embodiments, each resource request is processed by the winner-take-all circuit in a constant period of time, regardless of a quantity of resources that can be requested.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

FIG. 6 illustrates a logic and timing simulation of one particular exemplary embodiment of the system of the disclosure.

DETAILED DESCRIPTION

Figure 1A:
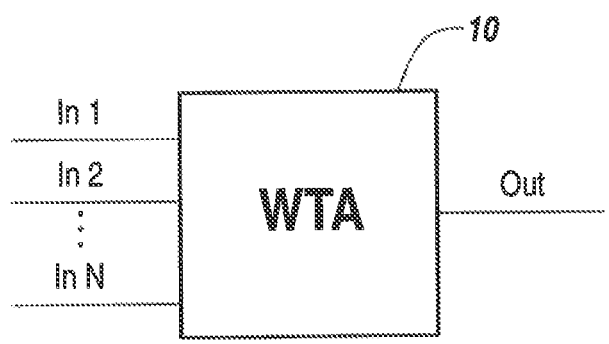
FIG. 1A includes a schematic block diagram of a winner-take-all (WTA) circuit, according to some exemplary embodiments.

The present disclosure is directed to an approach to arbitrating, allocating and otherwise managing multiple requests for resources. The approach of the disclosure is applicable in multiple situations in which the number of requests may greatly outweigh the number of resources being requested, and there is a need to switch between the multiple requests and resources very quickly. According to exemplary embodiments, in the case of a pulsed radar system, allocation of resources, such as jamming or sensing resources, can be allocated on a sub-pulse level, such that multiple threats can be jammed, and the system can switch between threats very quickly. According to the disclosure, each request may be associated with a priority level, based on the need of the requesting entity to have its request serviced by allocation to the resources. In some exemplary embodiments, the highest-priority requests are instantly allocated to resources, regardless of the current state of the resources, that is, even if there are one or more lower-priority tasks currently occupying these resources.

According to the disclosure, in the case of the radar system application, the resources being requested and allocated can include multiple sub-apertures (elements) of a phased-array architecture. Each request may include identification of a specific configuration type, which refers to all valid combinations of elements of the array required to service the request, that is, for example, to transmit the specified radar signal. According to the exemplary embodiments, an architecture is provided to allow multiple resource requests for generally differing configuration types, having different priorities, to be made and resolved at the sub-pulse timing level. According to some exemplary embodiments, resource requests with the highest priority are allocated first. Specifically, in the configuration in which the system of the disclosure is implemented in a field-programmable gate array (FPGA), new resource requests can be allocated to resources in two single clock cycles of the FPGA. According to some exemplary embodiments, an ordered priority queue is also provided. The priority queue allows lower-priority resource requests to be continually reviewed for allocation to resources, such that missing or forgetting of lower-priority requests is avoided.

Conventional resource management, for example, radar resource management, involves managing resources at very coarse-grained level, e.g., at the millisecond level. These conventional radar resource managers manage modes and dwell schedules, i.e., which modes will run and which dwells get scheduled, but they do not operate at the pulse level. Common scheduling algorithms currently include: artificial intelligent algorithms, Q-RAM algorithms, stochastic dynamic programming algorithms, waveform-aided algorithms, and adaptive update rate algorithms. Many priority queue structures that implement a first-in, first-out (FIFO) queue, but where higher-priority items are served first, exist. Also, hash functions which directly map a value to a memory address in a table also exist. Prior approaches also schedule resources a priori and do not mediate real-time contention for resources. Furthermore, many sorting algorithms exist to sort prioritized lists, but all of them take at best N log N time steps, assuming N elements, to sort, which is too slow for the applications to which the present disclosure is applicable, such as the radar application. Other attempts recently have been made to solve the problem of allocation of resources by using a simple look-up table (LUT), in which all possible requests are mapped to all possible states; however, these LUT approaches are too resource inefficient and are too large to apply as the present disclosure is applied, since, for example, the LUT can become too large to implement in a FPGA or similar circuit. Also, these conventional LUT approaches do not ensure continuous automatic reconsideration of rejected requests to prevent forgetting of lower-priority requests. It is also noted that many of the prior approaches are primarily software solutions, which are dramatically slower than hardware solutions, in which the source of time delay is typically just combinational logic propagation delay.

The present disclosure describes an architecture and approach which allow multiple resource requests to be made and resolved at the sub-pulse timing level, in a single clock cycle, by being able to compare a configuration list with another configuration list, where each item in the list is compared in parallel. Resource requests with the highest priority are allocated first, in a single clock cycle. A priority interrupt list allows lower-priority resource requests to be continually reviewed for allocation so as to avoid forgetting of lower-priority requests.

According to the exemplary embodiments, a resource request queue is ordered in one clock cycle by a parallel configuration list method. The amount of hardware required increases quadratically with the maximum number of requests to be held in the priority queue, and so this application is best suited for low, static numbers of requestors. In some exemplary embodiments, each priority level has its own queue of requests that have not yet been granted, and the queue with the highest priority can also have a counter for each resource size requested, e.g., the number of requests in the queue which have requested each possible configuration type of resources, e.g., elements in the phased array. That is, the counter can keep track of the configuration type of requests in a queue for resource size 1, 2, . . . , j, where j is the largest resource size. According to some exemplary embodiments, a resource request can be either instantly granted in one cycle, or, if rejected, the request is added back into a priority queue and instantly granted as soon as the needed resource is freed, i.e., becomes available, without the same request having to be made again. According to the exemplary embodiments, the number of requests that are granted is maximized such that these constraints are satisfied, in constant time, in a single clock cycle. According to the exemplary embodiments, a coordinate-based architecture in which requests are associated with coordinates of possible requested resources, e.g., 1, 2, 3, 4 of a four-element phased array, such that each resource, not just the type of resource, is assigned a coordinate and a coordinate priority to create a resource configuration. According to the exemplary embodiments, a resource request configuration is compared with the current resource allocation state configuration to determine immediately a new resource allocation state configuration. The system of the disclosure will be in its optimal state, which accommodates high-priority requests first, after cycling through the priority queues of denied requests.

According to the disclosure, a circuit referred to herein as a "winner-take-all" (WTA) circuit, is provided. In some exemplary embodiments, the WTA circuit is a digital circuit which determines, based on state priority configuration, which resource request of a plurality of resource requests "wins", i.e., has higher priority, among the plurality of resource requests. This determination is made within a single clock cycle of the FPGA.

According to the disclosure, a circuit referred to herein as a "loser-take-all" (LTA) circuit, is also provided. In some exemplary embodiments, the LTA circuit is a digital circuit which determines which resource request of a plurality of resource requests "loses", i.e., has the lowest priority among many in less than an FPGA clock cycle.

According to the disclosure, a circuit referred to herein as a "highest of the lowest priority resource (HiLPR) queue circuit, which determines what is the lowest priority geometry and determines the highest priority among that lowest priority geometry for different geometry sizes, is also provided. The geometry can be, for example, the geometry of the configuration of the resources being allocated. For example, in the case in which the resources being allocated are segments or elements of a phased array, the geometry could be, for example, a circular geometry in which four symmetric quadrants are defined, and each quadrant is a resource to be allocated.

According to the disclosure, an RF state control approach, which determines optimal state allocation of RF resources at sub-pulse timing levels, is also provided. Again, the resources being allocated may be segments or elements of a phased array having a particular geometry. As noted above, the geometry could be, for example, a circular geometry in which four symmetric quadrants are defined, and each quadrant is a resource to be allocated.

Figure 1B:
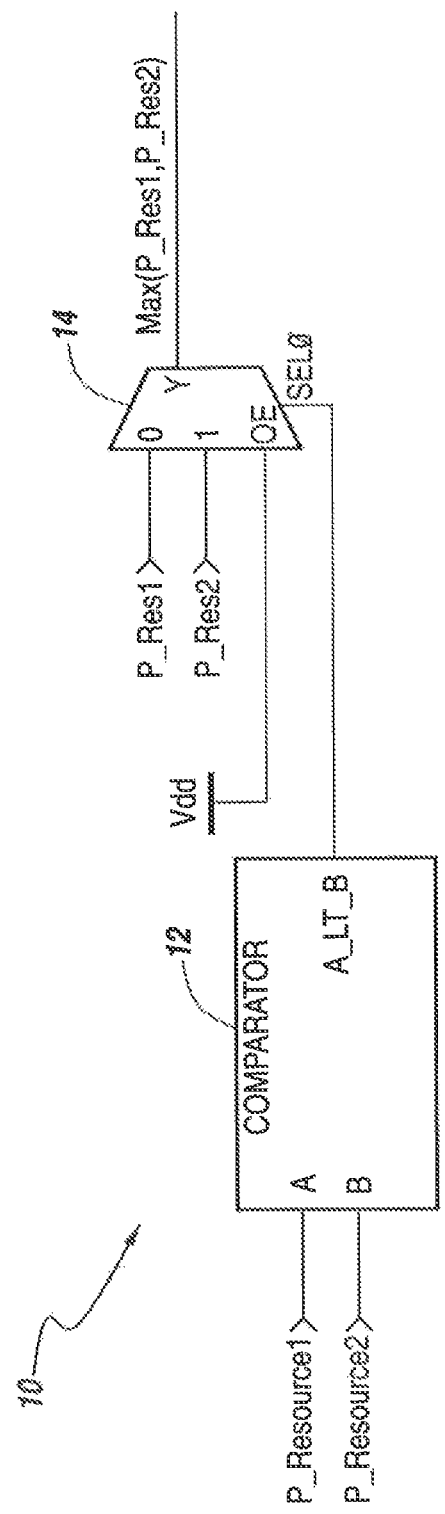
FIG. 1B includes a schematic combinational circuit diagram of a WTA circuit illustrated in FIG. 1A, in one particular exemplary embodiment.

FIG. 1A includes a schematic block diagram of a winner-take-all (WTA) logic circuit, according to some exemplary embodiments. FIG. 1B includes a schematic combinational circuit diagram of the WTA logic circuit illustrated in FIG. 1A, according to some particular exemplary embodiments.

That is, FIG. 1B is one particular exemplary detailed logic diagram of the WTA circuit of FIG. 1A. Referring to FIGS. 1A and 1B, the WTA circuit 10 receives multiple input signals, In 1, In 2, . . . , In N, which can be, for example, requests for resources. Each input signal includes a priority value and a data value, as referred to herein by In=<Priority, Value>.

The convention used in FIG. 1A for referring to the fields of the input signals is, for example, "In1.Priority" for the priority value of input signal In 1 and "In1.Value" for the data value of input signal In 1.

In the specific exemplary embodiment illustrated in FIG. 1B, WTA circuit 10 has two priority inputs from two respective resources and produces one priority output. The priority value for each resource 1 and 2 is indicated in FIG. 1B by P_Resource1 and P_Resource2, respectively.

According to some exemplary embodiments, all of the input signals are compared in the WTA circuit to determine the highest-priority input signal. The data value of that highest-priority input signal can then be output as the output signal of WTA circuit 10. In some exemplary embodiments, the circuitry of WTA circuit 10 is such that the following logic is applied to the input signals In 1, In 2, . . . , In N to determine the highest-priority input signal.

---

If In1.Priority > In2.Priority and ... InN.Priority,
Then Out = In1.Value;
Else,
If In2.Priority > In1.Priority and ... InN.Priority,
Then Out =In2.Value;
...
Else
Out = InN.Value

---

Referring to FIG. 1B, a comparator 12 compares the priority values P_Resource1 and P_Resource2. The two priority values P_Resource1 and P_Resource2 are also applied to selection circuit or multiplexer 14, which selects one of the priority values as the higher priority value of the two and outputs the selected value as the "winner" output priority value, indicated in FIG. 1B as Max(P_Res1, P_Res2). The Output Enable input to multiplexer 14 is held high, i.e., in the enabled state, by voltage Vdd. The selection signal is the output signal from comparator 12. If P_Resource1 is less than P_Resource2, i.e., then the output signal A_LT_B is high, such that the output P_Resource2 is selected by the multiplexer 14 as the "winner" priority value. Otherwise, the output P_Resource1 is selected by the multiplexer 14 as the "winner" priority value.

Figure 2A:
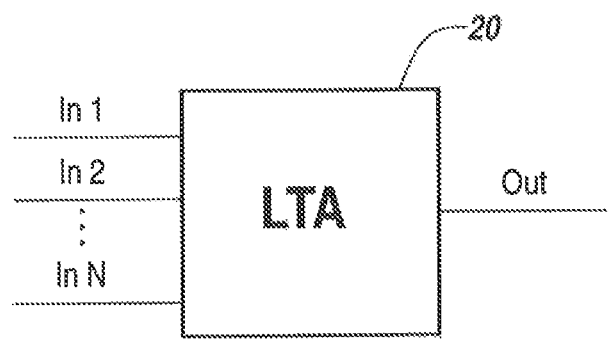
FIG. 2A includes a schematic block diagram of a loser-take-all (LTA) circuit, according to some exemplary embodiments.
Figure 2B:
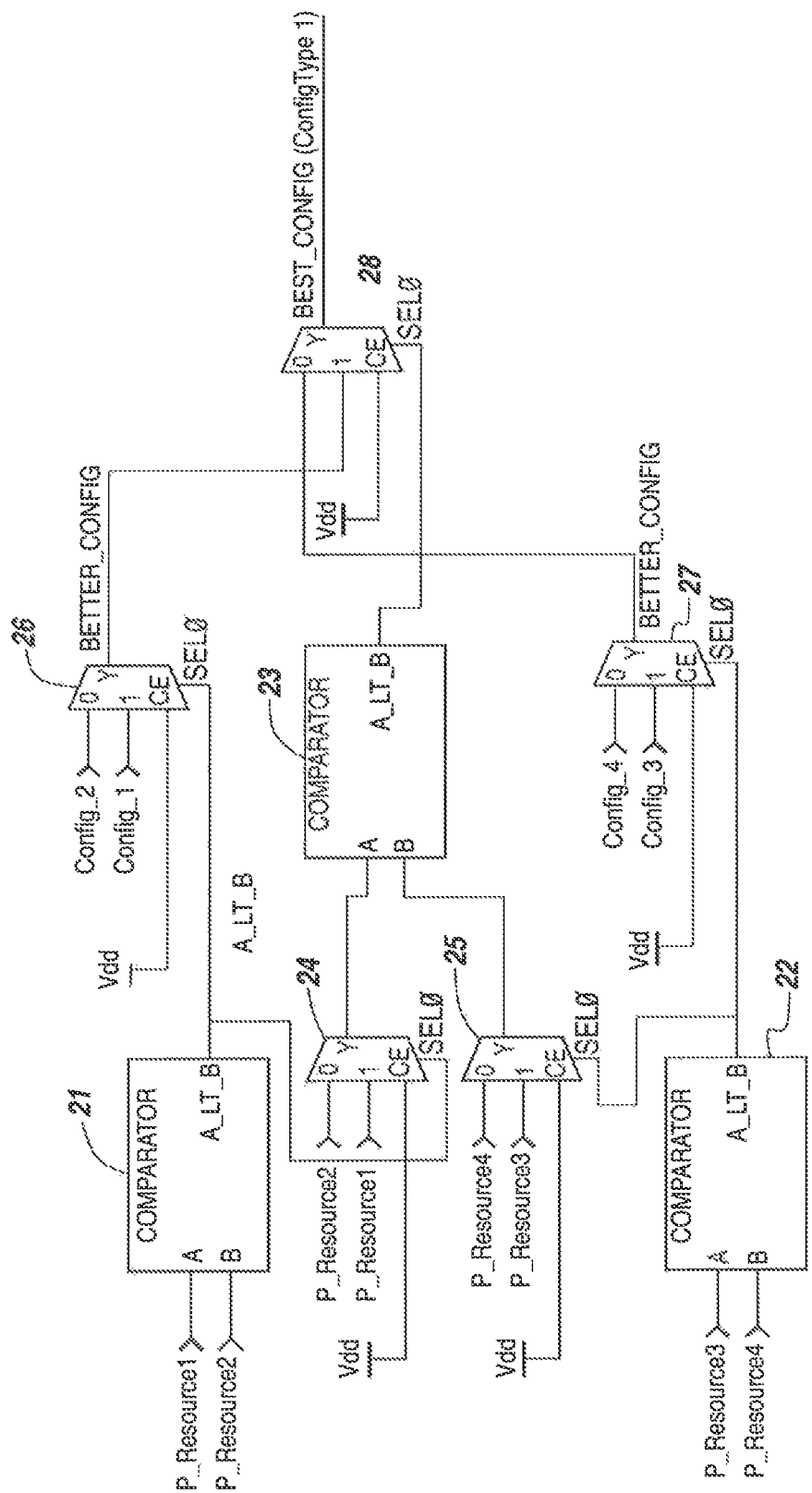
FIG. 2B includes a schematic combinational circuit diagram of a LTA circuit illustrated in FIG. 2A, in one particular exemplary embodiment.

FIG. 2A includes a schematic block diagram of a loser-take-all (LTA) logic circuit, according to some exemplary embodiments. FIG. 2B includes a schematic combinational circuit diagram of the LTA logic circuit illustrated in FIG. 2A, according to some particular exemplary embodiments. That is, FIG. 2B is one particular exemplary detailed logic diagram of the LTA circuit of FIG. 2A. Referring to FIGS. 2A and 2B, the LTA circuit 20 receives multiple input signals, In 1, In 2, . . ., In N, which can be, for example, requests for resources.

In the specific exemplary embodiment illustrated in FIG. 2B, LTA circuit 20 has four priority inputs, four configuration type inputs, and one configuration type output.

According to some exemplary embodiments, all of the input signals are compared in the LTA circuit to determine the lowest-priority input signal. The data value of that lowest-priority input signal can then be output as the output signal of LTA circuit 20. In some exemplary embodiments, the circuitry of LTA circuit 20 is such that the following logic is applied to the input signals In 1, In 2, . . . , In N to determine the lowest-priority input signal.

```
If In1.Priority < In2.Priority and ... InN.Priority,
Then Out = In1.Value;
Else,
If In2.Priority < In1.Priority and ... InN.Priority,
Then Out =In2.Value;
...
Else
Out = InN.Value
```

Referring to FIG. 2B, in the illustrated exemplary embodiment, two priority values P_Resource1 and P_Resource2 are compared in comparator 21, and two priority values P_Resource3 and P_Resource4 are compared in comparator 22. The associated configuration types Config_1, Config_2, Config_3 and Config_4 are applied to selection circuits, such as multiplexers 26 and 27 as shown. The selections in multiplexers 26 and 27 are controlled by the outcomes of the comparisons in comparators 21 and 22, respectively. That is, if the priority value P_Resource1 is less than the priority value P_Resource2, then multiplexer 26 selects configuration type Config_1 to be output as its BETTER_CONFIG output. Also, multiplexer 24 outputs priority value P_Resource1 to comparator 23 as one of its two inputs. Otherwise, multiplexer 26 selects configuration type Config_2 to be output as its BETTER_CONFIG output, and multiplexer 24 outputs priority value P_Resource2 to comparator 23 as one of its two inputs. Similarly, if the priority value P_Resource3 is less than the priority value P_Resource4, then multiplexer 27 selects configuration type Config_3 to be output as its BETTER_CONFIG output. Also, multiplexer 25 outputs priority value P_Resource3 to comparator 23 as the other of its two inputs. Otherwise, multiplexer 27 selects configuration type Config_4 to be output as its BETTER_CONFIG output, and multiplexer 25 outputs priority value P_Resource4 to comparator 23 as the other of its two inputs.

Continuing to refer to FIG. 2B, the selected priority value outputs of multiplexers 24 and 25 are compared in comparator 23. Also, the associated selected BETTER_CONFIG configuration types from multiplexers 26 and 27 are applied as the selectable inputs to multiplexer 28. The one of the two BETTER_CONFIG configuration types selected by multiplexer 28 is output as the "loser" output of LTA circuit 20, referred to as the BEST_CONFIG configuration type in FIG. 2B. The selection of the BEST_CONFIG configuration type is based on the outcome of the comparison performed by comparator 23. Specifically, if the priority value applied at input A of comparator 23 is less than the priority value applied at input B, then the BETTER_CONFIG configuration type from comparator 26 is selected for output by comparator 28 as the BEST_CONFIG configuration type, i.e., the "loser" of the LTA circuit 20. Otherwise, the BETTER_CONFIG configuration type from comparator 27 is selected for output by comparator 28 as the BEST_CONFIG configuration type, i.e., the "loser" of the LTA circuit 20.

It is noted that priority values for multiple input signals can be the same. In case of such priority ties, various tie-breaking approaches can be used. In some exemplary embodiments, if two input priorities are tied, the input number closer to 1 wins, i.e., In 1 beats In 2 if In1.Priority=In2.Priority.

Figure 3A:
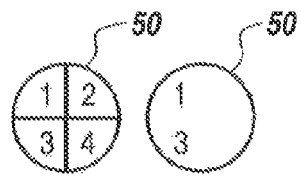
FIGS. 3A-3D include schematic diagrams which illustrate the use of the WTA circuit and LTA circuit, according to some particular exemplary embodiments.

The WTA circuit 10 and LTA circuit 20 described above provide the sorting used according to the disclosure to determine how resources should be assigned. FIGS. 3A-3D include schematic diagrams which illustrate the use of the WTA circuit 10 and LTA circuit 20, according to some particular exemplary embodiments. FIG. 3A illustrates an exemplary geometry of a phased-array 50 to which the present disclosure is applicable. As illustrated in FIG. 3A, exemplary phased array 50 is shown to be a circular array divided into four symmetric quadrants, numbered 1, 2, 3, 4. FIG. 3A includes also a schematic representation of how half, i.e., two, of the quadrants, namely, quadrants 1 and 3, can be combined and used simultaneously by the same inputs. These quadrants of phased array 50 are the resources being allocated in accordance with the disclosure, in this particular exemplary illustration.

In general, during normal operation, it is assumed that all of the resources, i.e., quadrants of array 50, are assigned to existing current input signals with various priorities, when a new input constituting a resource request is received. It should be noted that any of the input signals can be assigned to any number of resources. That is, one or more of the assigned input signals may be assigned to more than one quadrant of array 50. This can be because a particular input may require more than one quadrant to be serviced. For example, a particular radar signal may need to be transmitted on more than one quadrant of array 50. According to the disclosure, a determination is made as to whether the new input signal has high enough priority to replace any of the current input signals and take over the associated resource(s). It is desirable to replace the existing input(s) with the lowest priority. Also, the new input may request more than one resource. So, according to the disclosure, the highest priority among each group of possible combinations of existing inputs is determined. Ultimately, the lowest-priority input which is the highest-priority among its group is determined.

Figure 3B:
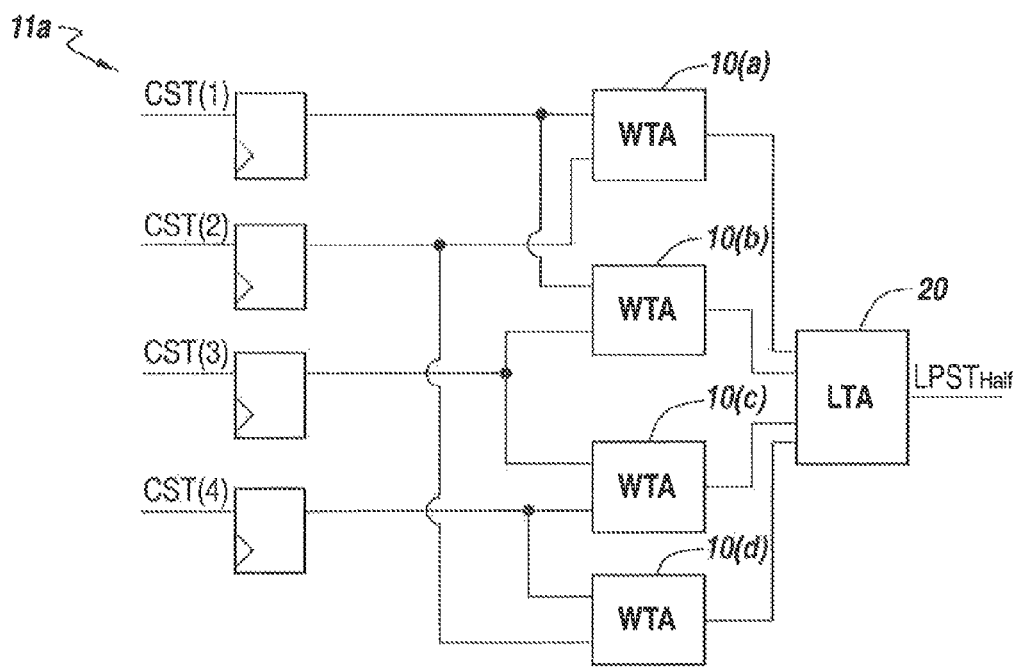
Figure 3C:
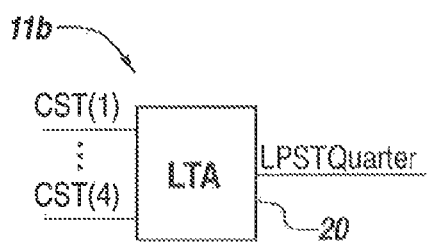
Figure 3D:
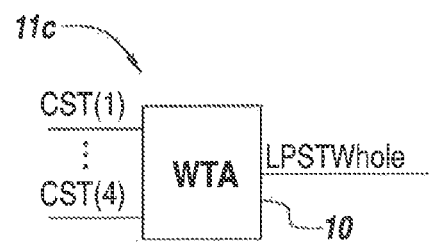

FIG. 3B-3D include schematic diagrams which illustrate lowest priority determination circuits 11a, 11b, 11c, respectively, which carry out the determination of this lowest-priority current state (LPST) for the four-quadrant array 50 illustrated in FIG. 3A, for each possible quantity of requested resources. Specifically, the lowest priority determination circuit 11a of FIG. 3B carries out the determination for half of the quadrants, $LPST_{Half}$. The lowest priority determination circuit 11b of FIG. 3C carries out the determination for one quarter of the quadrants, $LPST_{Quarter}$. The lowest priority determination circuit 11c of FIG. 3D carries out the determination for all of the possible quadrants, $LPST_{Whole}$.

FIG. 3B illustrates the determination of which 2-quadrant group can be replaced first. Referring to FIG. 3B, the current state inputs CST(1), CST(2), CST(3) and CST(4) are selectively applied in pairs to WTA circuits 10. Specifically, WTA 10(a) determines whether CST(1) or CST(2) has a higher priority and provides the higher-priority value as its output. WTA 10(b) determines whether CST(1) or CST(3) has a higher priority and provides the higher-priority value as its output. WTA 10(c) determines whether CST(3) or CST(4) has a higher priority and provides the higher-priority value as its output. WTA 10(d) determines whether CST(2) or CST(4) has a higher priority and provides the higher-priority value as its output. The four "winning" higher-priority signals are then applied to LTA circuit 20. The lowest-priority signal of the four is output by LTA circuit 20 as the $LPST_{Half}$.

FIG. 3C illustrates the determination of which single, i.e., quarter, quadrant can be replaced first, i.e., is associated with the lowest-priority current state. The current state inputs CST(1), CST(2), CST(3) and CST(4) are applied to LTA circuit 20. The lowest priority signal of the four is output by LTA circuit 20 as the $LPST_{Quarter}$.

FIG. 3D illustrates the determination of the priority level of the group of four current state inputs applied to array 50. The current state inputs CST(1), CST(2), CST(3) and CST (4) are applied to WTA circuit 10. The priority level of the four is output by WTA circuit 10 as the $LPST_{Whole}$.

Figure 4A:
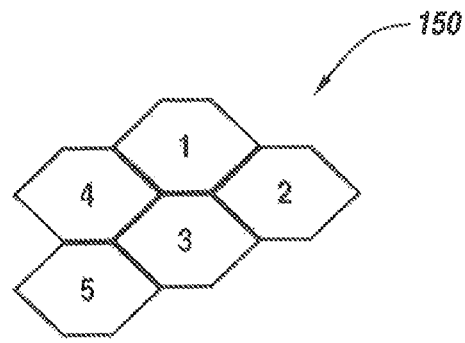
FIGS. 4A and 4B include schematic diagrams which illustrate the use of the WTA circuit and LTA circuit, according to some particular exemplary embodiments.
Figure 4B:
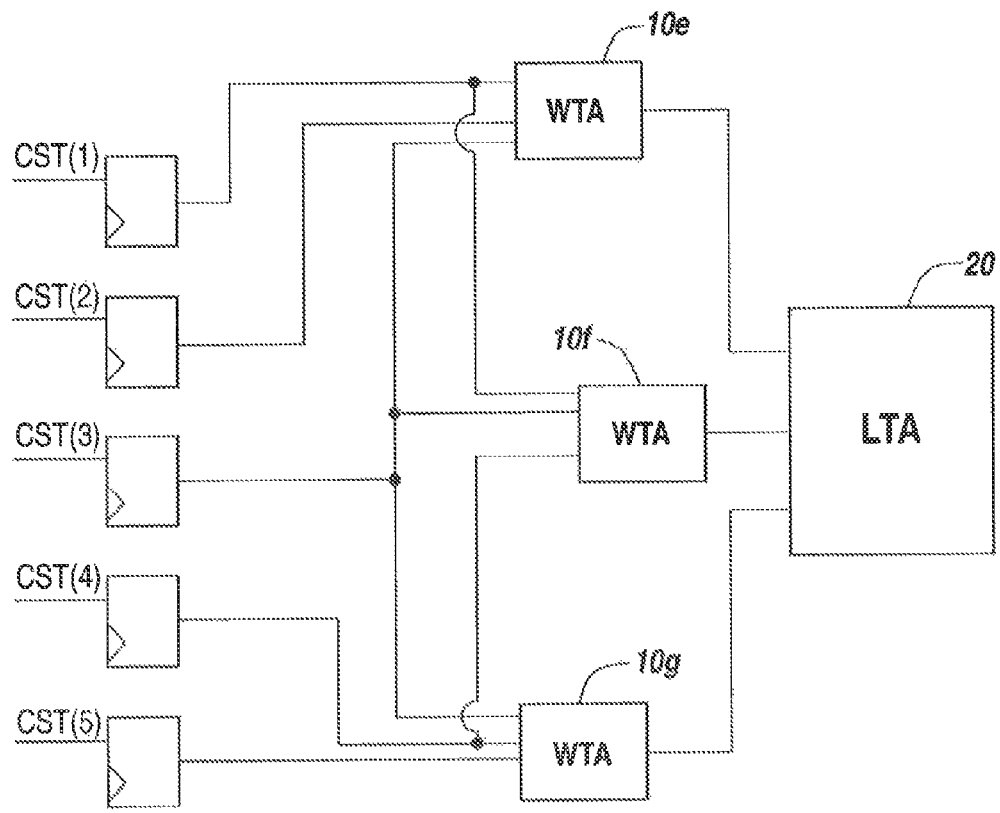

FIGS. 4A and 4B include schematic diagrams which illustrate the use of the WTA circuit 10 and LTA circuit 20, according to some particular exemplary embodiments. In the embodiments illustrated in FIGS. 4A and 4B, the resources being allocated are once again segments or elements of a phased array 150. However, in contrast with FIGS. 3A-3D, phased array 150 of FIGS. 4A and 4B includes five hexagonally shaped elements arranged as shown. It should be noted that this array configuration is also exemplary only. It is intended to illustrate that the present disclosure is applicable to any geometry of resources.

FIG. 4B illustrates an exemplary circuit which determines which set of three adjacent elements should be replaced based on priority. Referring to FIG. 4B, the current state inputs CST(1), CST(2), CST(3), CST(4) and CST(5) are selectively applied to WTA circuits 10. Specifically, WTA 10(e) determines whether CST(1), CST(2) or CST(3) has the highest priority and provides the highest-priority signal as its output. WTA 10(f) determines whether CST(1), CST(3) or CST(4) has the highest priority and provides the highest-priority value as its output. WTA 10(g) determines whether CST(3), CST(4) or CST(5) has the highest priority and provides the highest-priority value as its output. The three "winning" highest-priority signals are then applied to LTA circuit 20. The lowest-priority signal of the three is output by LTA circuit 20.

Figure 5:
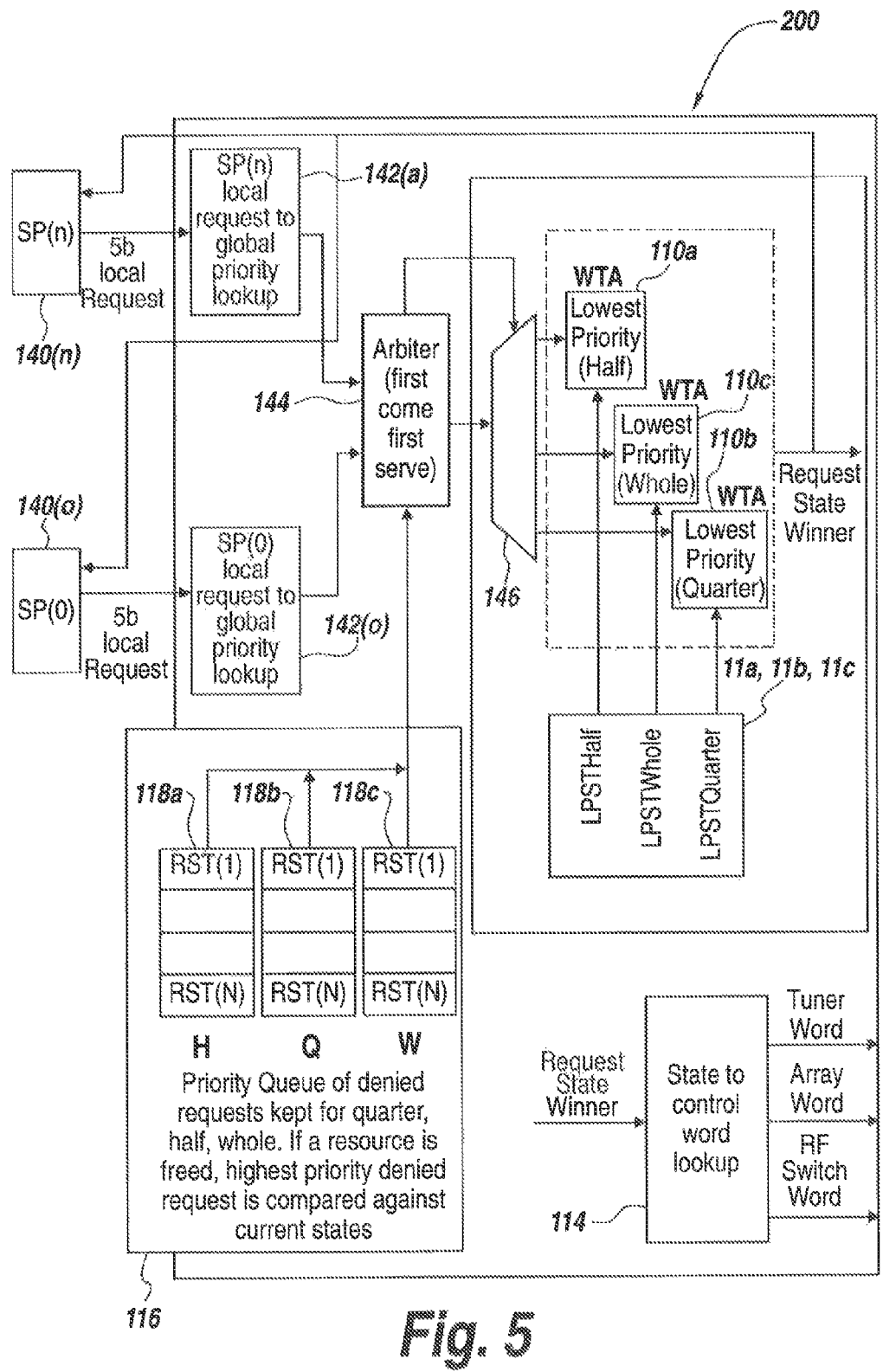
FIG. 5 includes a schematic block diagram which illustrates a fast geometric resource manager/controller of the disclosure, according to some exemplary embodiments.

FIG. 5 includes a schematic block diagram which illustrates the fast geometric resource manager/controller of the disclosure, according to some exemplary embodiments. Referring to FIG. 5, the resource manager/controller 200 receives the input signals, which are considered herein to be requests for resources, from a plurality of signal processing (SP) circuits 140(0) . . . 140(n), and carries out allocation of resources using prioritization of the requests, according to some exemplary embodiments described herein in detail. In the case of the radar system application, the SP circuits 140 generate the control signal used to control routing an RF signal for transmission via the phased array. The control signal typically includes a control word used to control such signal parameters as tuner frequency, array element control, RF switch control for signal routing, and other parameters. According to the disclosure, if it is determined that a particular SP 140 will be assigned to a resource, resource manager/controller 200 provides an update to the control word used by the particular SP 140 to ensure that its signal will be properly implemented on the determined resources.

Referring to FIG. 5, it is noted that the detailed description refers to the particular exemplary embodiment in which the resource manager/controller 200 is applied to a radar system having phased array 50 divided into four quadrants. It will be understood that the description is applicable to other forms of resource allocation. For purposes of this description, it is assumed that the SPs 140 can issue requests simultaneously. Each SP 140 sends a request to the resource manager/controller 200. The request includes a local priority word, which can be in the form of, for example, a five-bit word, such that each local SP 140 is not responsible for managing global priority. Each request is received by a look-up table 142(0) . . . 142(n), which converts the local priority word to a global priority word. Requests are then received by an arbiter 144 which enables the requests for processing, in some embodiments on a first-come, first-served basis. The arbiter 144 also arbitrates priority with previously denied requests from a priority queue 116.

Arbiter 144 passes the signals one-at-a-time to a selection circuit/multiplexer 146. Arbiter 144 also passes a control signal for multiplexer 146 to select the appropriate output of multiplexer 146 at which the signal is output. This selection is bases on the amount of resources requested in the input signal. For example, in the exemplary illustration, the selection is based on whether the signal or request is requesting one quarter of the array, one half of the array or the whole array. The selected signal from multiplexer 146 is applied to a WTA circuit 110a, 110b or 110c depending on whether the signal is requesting half of the array, a quarter of the array or the whole array, respectively.

The priority of the selected requesting signal is compared to the appropriate LPST signal generated as described above in connection with FIGS. 3B-3C. Specifically, if the requesting signal is for half of the array, its priority is compared to that of the $LPST_{Half}$ signal generated by lowest priority determination circuit 11a illustrated in FIG. 3B; if the requesting signal is for the whole array, its priority is compared to that of the $LPST_{Whole}$ signal generated by lowest priority determination circuit 11c illustrated in FIG. 3D; and if the requesting signal is for one quarter of the array, its priority is compared to that of the $LPST_{Quarter}$ signal generated by lowest priority determination circuit 11b illustrated in FIG. 3C.

Thus the priority of an incoming request, or a previously denied request, is compared to the priority of a request that is currently assigned to a resource. If the priority of the incoming request or previously denied request exceeds the priority of the currently assigned request, then the incoming request is granted, the SP 140 that initiated the request is notified, and the request is assigned to a resource. To that end, the winning request is applied to a look-up table 114 which matches the state of the winning request with the control word to be incorporated within the control signal issued by the SP 140 which originated the winning request. With that control word in its control signal, the winning SP 140 is provided access to the requested resource.

Denied requests are stored in denied request priority queue 116. In the particular exemplary embodiment being described, denied request priority queue 116 actually includes three priority queues 118a, 118b, 118c for storing requests for half the array, one quarter of the array and the whole array, respectively. Hence, denied requests are continually being re-processed based on their priority in priority queue 116 to ensure that requests with lower priority than any denied requests are not granted in favor of higher-priority previously-denied requests.

Continuing to refer to FIG. 5, in summary, an incoming state request with a local priority is translated into global priority, such that each request has its own unique priority. The incoming request is applied through a WTA circuit with the LPST. The request is routed to the appropriate LPST WTA comparison based on whether quarter, half or whole array is being requested. According to the disclosure, this can be generalized to any geometry. Based on the outcome of the WTA with the LPST, the request is granted or denied, and the requester is notified. Denied requests are placed in a corresponding priority queue for quarter, half, whole array, generalized according to the disclosure to any geometry. If a resource is freed, LPSTs are recalculated based on current states, and the first request in the appropriate denied request priority queue is compared through the WTA with the recalculated LPSTs. For winning states, a control word is sent to the appropriate SP and resource control switch to adjust the state. Upon state update, the priority-by-state look-up tables 142 and control word look-up tables 114 are updated through a double buffer mechanism. The resource control switch is external and is specific to a particular application to which the present disclosure is applied.

FIG. 8 includes a schematic top-level state machine diagram of the system of the disclosure, according to some exemplary embodiments.

Figure 7:
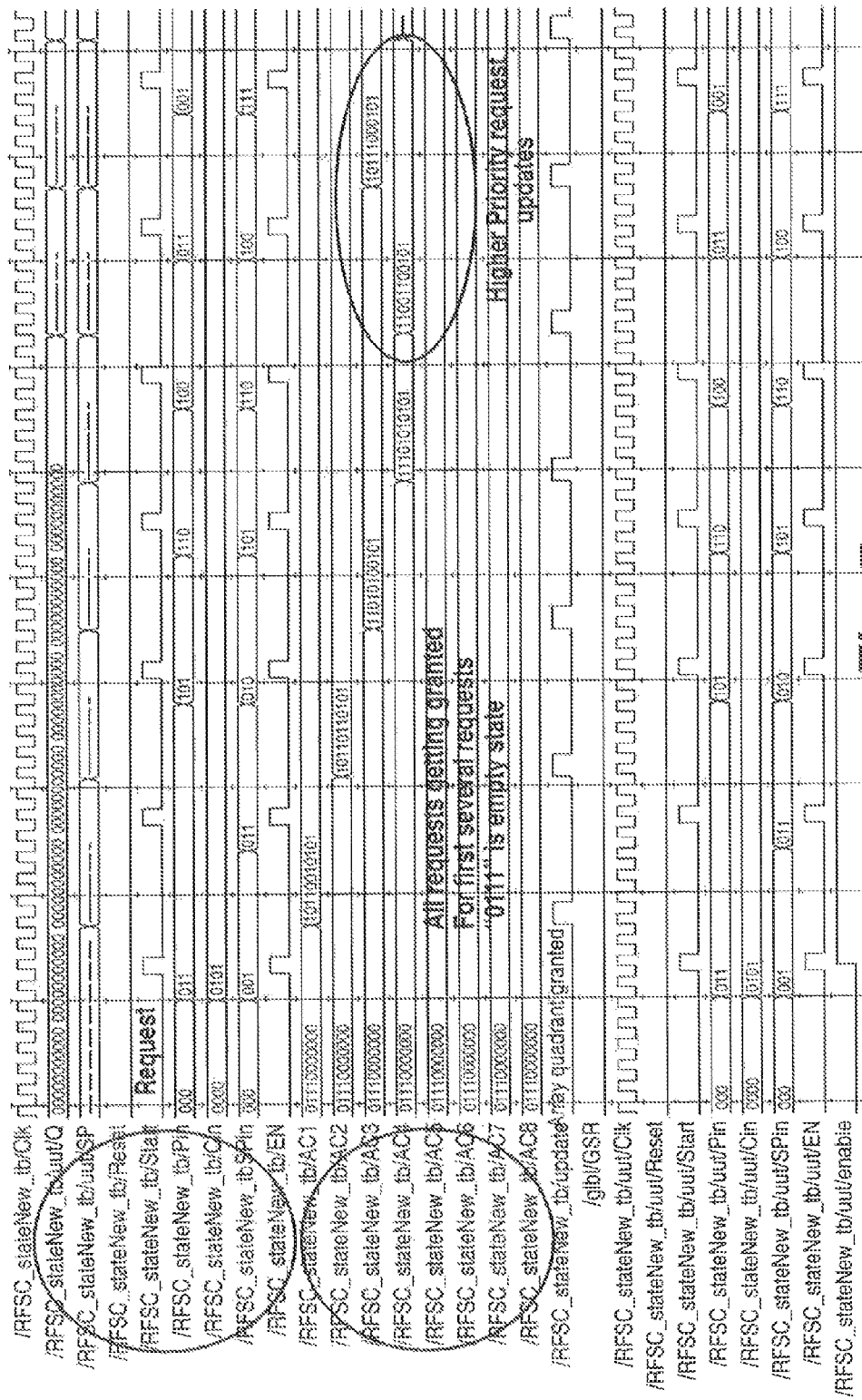
FIG. 7 includes a state machine diagram illustrating one particular exemplary embodiment of the system of the disclosure.

FIG. 7 includes a simulated logic and timing diagram of one particular embodiment of the invention, such that requests are competing for a resource with four components, and such that the first four requests are granted on empty resources, and then two more requests are granted by displacing lower priority requests currently running on the resource.

Various embodiments of the above-described systems and methods may be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). The mobile computing device includes, for example, a Blackberry®, iPAD®, iPhone® or other smartphone device.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

The invention claimed is:

1. A method for allocating resources of a phased array system via a single pass algorithm, wherein the resources of the phased array system include a plurality of elements of the phased array system arranged in a particular geometry, the method comprising:
   receiving one or more resource requests for the resources of the phased array system, wherein each of the one or more resource requests is for one of a plurality of configuration types, wherein each configuration type is characterized by one or more geometric constraints defining a set of all possible configurations of the phased array system that are able to satisfy resource requests of that configuration type, wherein each configuration in the set of all possible configurations includes a specific combination of one or more elements of the phased array system representing a geometric subset of the phased array system, and wherein each of the one or more resource requests includes a request priority, the configuration type for that resource request and a requestor identifier;
   selecting one of the one or more resource requests for processing;
   determining a lowest priority current state for the configuration type of the selected resource request, wherein the determining the lowest priority current state includes:
      (i) for each configuration in the configuration type of the selected resource request comparing, in a winner-take-all circuit, existing priorities for each of the one or more elements of the phased array system in the specific combination of one or more elements of the phased array system included in that configuration so as to determine a current priority for that configuration characterized by a highest of the priorities of the elements included in that configuration, wherein the existing priorities are determined based on priorities for tasks currently occupying one or more elements of the phased array system; and
      (ii) comparing, in a loser-take-all circuit, the current priorities for each of the configurations in the configuration type of the selected resource request, as determined by the winner-take-all circuit, so as to identify which of the configurations within the configuration type of the selected request has a lowest current priority;
   determining whether to grant the selected resource request based on whether the request priority for the selected resource request is greater than the current priority for the configuration within the configuration type of the selected resource request that was identified as having the lowest current priority, and
   upon determining that the selected resource request is granted, allocating, to the requestor of the selected resource request, use of the specific combination of one or more elements of the phased array system in the configuration that was identified as having the lowest current priority.

2. The method of claim 1, wherein the selected resource request is a first one of the one or more resource requests to be received.

3. The method of claim 1, further comprising:
   upon the selected resource request being denied, adding the selected resource request to a denied request queue of previously denied resource requests having the same configuration type as the selected resource request and
   upon the selected resource request being granted, adding a previously granted resource request task currently utilizing one or more elements of the phased array system in the configuration that was identified as having the lowest current priority to a denied request queue having the same configuration type as the previously granted resource request.

4. The method of claim 1, wherein each selected resource request is processed in a constant period of time, regardless of a quantity of resources that can be requested and requestors competing for the resources.

5. The method of claim 1, wherein the selected resource request is selected by comparing the request priority of a newly received resource request to a queue of previously denied resource requests having the same configuration type as the newly received resource request, wherein the resource request with the highest priority between the newly received and previously denied resource requests is selected.

6. The method of claim 1, wherein the elements in the phased array system are arranged in a circular geometry in which four symmetric quadrants are defined, wherein each configuration in the set of all possible configurations in each configuration type includes a specific combination of one or more quadrants of the phased array system.

7. The method of claim 6, wherein the plurality of configuration types includes a first configuration type which is defined as a quarter array configuration type and which includes configurations utilizing a single quadrant, a second configuration type which is defined as a half array configuration type and which includes configurations utilized a pair of adjacent quadrants and a third configuration type which is defined as a whole array configuration type and which includes configurations utilizing all quadrants, wherein the selected resource is for either the first, second or third configuration types.

8. The method of claim 1, wherein the one or more geometric constraints for each configuration type includes one or more of (i) constraints relating to a minimum or maximum number of elements,(ii) constraints relating to an absolute positioning of one or more elements and (iii) constraints relating to a relative positioning between one or more elements.

9. A system for allocating resources of a phased array system via a single pass algorithm, wherein the resources of the phased array system include a plurality of elements of the phased array system arranged in a particular geometry, the system comprising:
- a first in, first out (FIFO) buffer for selecting one of one or more received resource requests for resources of a phased array system, wherein each of the one or more resource requests is for one of a plurality of configuration types, wherein each configuration type is characterized by one or more geometric constraints defining a set of all possible configurations of the phased array system that are able to satisfy resource requests of that configuration type, wherein each configuration in the set of all possible configurations includes a specific combination of one or more elements of the phased array system representing a geometric subset of the phased array system, and wherein each of the one or more received resource requests includes a request priority, the configuration type for that resource request and a requestor identifier;
- a winner-take-all circuit configured for (i) comparing, for each configuration in the configuration type of the selected resource request, existing priorities for each of the one or more elements of the phased array system in the specific combination of one or more elements of the phased array system included in that configuration and (ii) determining, for each configuration in the configuration type of the selected resource request, a current priority for that configuration characterized by a highest of the priorities of the elements included in that configuration, wherein the existing priorities are determined based on priorities for tasks currently occupying one or more elements of the phased array system; and
- a loser-take-all circuit configured for (i) comparing the current priorities for each of the configurations in the configuration type of the selected resource request, as determined by the winner-take-all circuit, and (ii) identifying which of the configurations within the configuration type of the selected request has a lowest current priority; and
- resource allocation logic configured to (i) determine whether to grant the selected resource request based on whether the request priority for the selected resource request is greater than the current priority for the configuration within the configuration type of the selected resource request that was identified as having the lowest current priority and (ii) upon the selected resource request being granted, allocate, to a requestor of the selected resource request, use of the specific combination of one or more elements of the phased array system in the configuration that was identified as having the lowest current priority.

10. The system of claim 9, further comprising an output port for providing control information about which tasks are currently allocated on the system's resources.

11. The system of claim 9, wherein the FIFO buffer selects a first one of the one or more resource requests to be received.

12. The system of claim 9, further comprising one or more denied request queues, wherein the system is configured to (i) upon the selected resource request being denied, add the selected resource request to a denied request queue of previously denied resource requests having the same configuration type as the selected resource request and (ii) upon the selected resource request being granted, add a previously granted resource request task currently utilizing one or more elements of the phased array system in the configuration that was identified as having the lowest current priority to a denied request queue having the same configuration type as the previously granted resource request.

13. The system of claim 9, wherein the one or more resources include a plurality of resource elements.

14. The system of claim 13, further comprising a plurality of winner-take-all circuits and loser-take-all circuits including a different winner-take-all circuit and a different loser-take all circuit for each configuration type.

15. The system of claim 9, wherein the system is configured to process each resource request in a constant period of time, regardless of a quantity of resources that can be requested.

16. The system of claim 9, wherein the system is further configured for selecting a resource request by comparing the request priority of a newly received resource request to a queue of previously denied resource requests having the same configuration type as the newly received resource request, wherein the resource request with the highest priority between the newly received and previously denied resource requests is selected.

17. The system of claim 9, wherein the elements in the phased array system are arranged in a circular geometry in which four symmetric quadrants are defined, wherein each configuration in the set of all possible configurations in each configuration type includes a specific combination of one or more quadrants of the phased array system.

18. The system of claim 17, wherein the plurality of configuration types includes a first configuration type which is defined as a quarter array configuration type and which includes configurations utilizing a single quadrant, a second configuration type which is defined as a half array configuration type and which includes configurations utilized a pair of adjacent quadrants and a third configuration type which is defined as a whole array configuration type and which includes configurations utilizing all quadrants, wherein the selected resource is for either the first, second or third configuration types.

19. The system of claim 9, wherein the one or more geometric constraints for each configuration type includes one or more of (i) constraints relating to a minimum or maximum number of elements, (ii) constraints relating to an absolute positioning of one or more elements and (iii) constraints relating to a relative positioning between one or more elements.

* * * * *